Oct. 9, 1934.  L. F. NENNINGER ET AL  1,976,139
MILLING MACHINE
Filed March 1, 1933  5 Sheets-Sheet 1

Inventors
LESTER F. NENNINGER
BERNARD SASSEN
By
A. K. Parsons
Attorney

Oct. 9, 1934.  L. F. NENNINGER ET AL  1,976,139
MILLING MACHINE
Filed March 1, 1933   5 Sheets-Sheet 3

Inventors
LESTER F. NENNINGER
BERNARD SASSEN
By AHK Parsons
Attorney

Patented Oct. 9, 1934

1,976,139

UNITED STATES PATENT OFFICE 1,976,139

MILLING MACHINE

Lester F. Nenninger and Bernard Sassen, Cincinnati, Ohio, assignors to The Cincinnati Milling Machine Company, Cincinnati, Ohio, a corporation of Ohio Application March 1, 1933, Serial No. 659,229

34 Claims. (Cl. 90—21)

This invention relates to milling machines, and more particularly to improvements in control mechanism therefor.

One of the principal objects of this invention is to minimize the effort required by milling machine operators to effect changes in the rate of relative movement between a cutter and tool as well as changes in the speed of rotation of the cutter.

Another object of this invention is to simplify the speed and feed control mechanism for a milling machine so that inter-connecting mechanical linkages may be eliminated and the desired adjustments effected in an easy and efficient manner.

A further object of this invention is to provide improved electrical control mechanism for the various functions of a milling machine including various interlocking features which prevent rotation of the spindle during rapid traverse movement of the work support, or changes being made in the spindle speed during its rotation.

A still further object of this invention is the provision of a speed change control mechanism which may be adjusted to function as a progressive, a selective or a preselective control system.

Other objects and advantages of the present invention should be readily apparent by reference to the following specification considered in conjunction with the accompanying drawings illustrative of one embodiment thereof, but it will be understood that any modifications may be made in the specific structural details thereof within the scope of the appended claims, without departing from or exceeding the spirit of the invention.

Referring to the drawings in which like reference numerals indicate like or similar parts.

In the drawings, the reference numeral 10 indicates the column of a milling machine, having vertical guideways 11 formed upon one face thereof for reciprocably receiving a knee 12, which carries, for cross adjustment, a saddle 13. The saddle in turn supports a table 14 for reciprocating movement laterally of the direction of saddle movement. The column also has a cutter spindle 15 journaled therein for rotating an arbor 16 upon which may be secured a cutter 17 for removing metal from a work piece carried by the table. An overarm 18 is adjustably mounted on the column for supporting the outboard end of the arbor 16 through the medium of a pendant 19. These parts constitute the well-known elements of a knee and column type milling machine.

Figure 3:
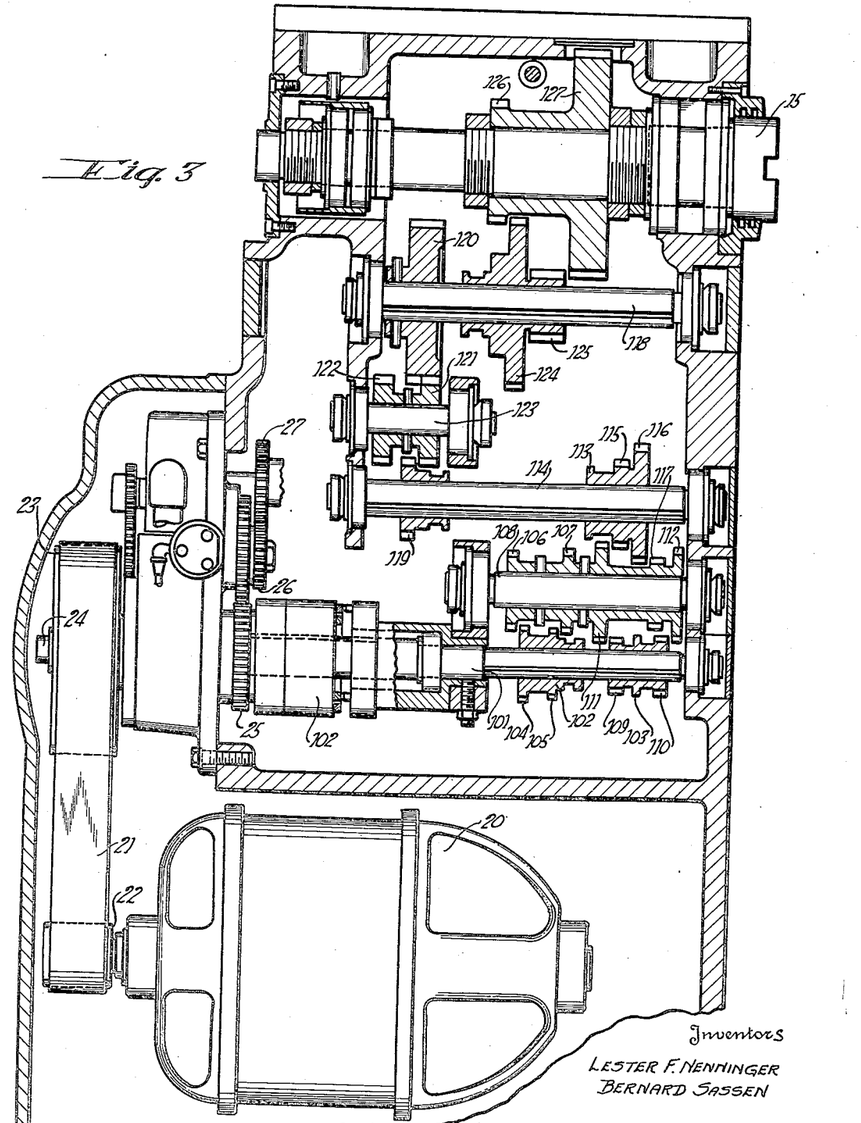
Figure 3 is a section through the column of the machine showing the spindle transmission and actuating parts therefor.
Figures 4, 5, 13, 14:
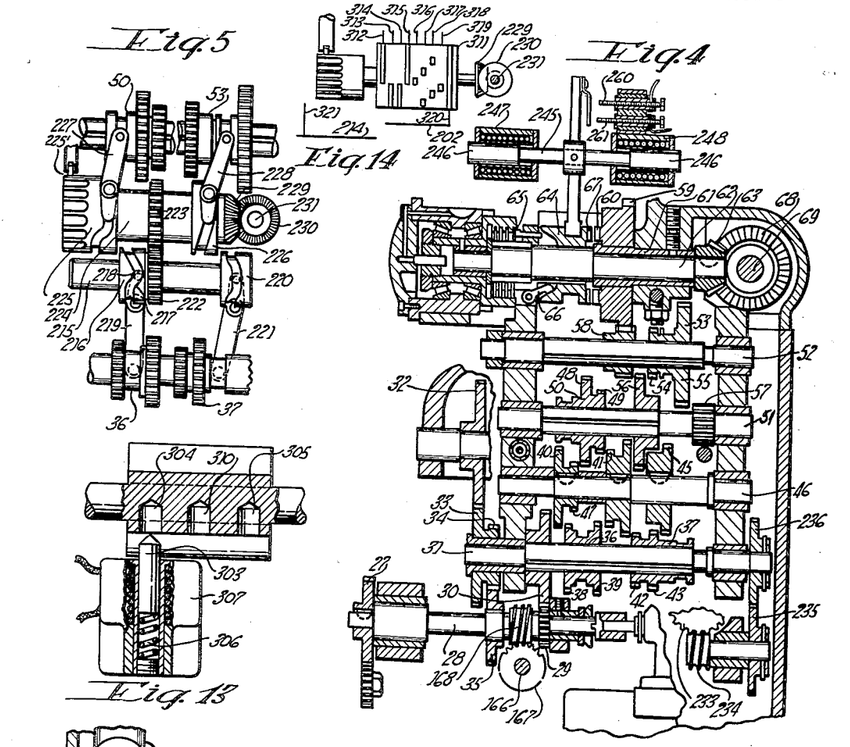
Figure 4 is an expanded view of the feed change mechanism for the various work supporting members.
Figure 5 is a detail view showing the feed change control cams.
Figure 13 is a detail view of the automatic detent mechanism associated with each shifter arm of the speed transmission.
Figure 14 is a detail view of drum switch for controlling feed transmission.

The knee, saddle and table of this type of machine may be and usually are power actuated relative to the cutter and to each other in opposite directions and at variable rates and in addition the cutter is also power rotatable at variable speeds. For this purpose a transmission is provided, one conventional form of which is shown in Figures 3 and 4, and which may receive power from a prime mover 20 located in the base of the column. The one may be connected to the other by a power transmission band 21 which passes around pulley 22 of the motor and pulley 23 secured to the end of the main driving shaft 24 of the transmission. In the form shown this shaft has a gear 25 secured thereto which is continuously driven during operation of the prime mover. This gear through the couplet 26 actuates the spur gear 27 keyed to a horizontal shaft 28 journaled in the column. This shaft also has a pinion 29 fixed therewith which meshes with a gear 30 secured to the primary shaft 31 of the variable feed transmission. The shaft 28 also serves to actuate a rapid traverse transmission comprising a final member 32 and an interposed gear train 33, 34 and 35.

The variable feed transmission comprises the gear couplets 36 and 37 splined on the shaft 31 for constant rotation thereby, the couplet 36 including the gears 38 and 39 shiftable into mesh with the gears 40 and 41 respectively; while the couplet 37 comprises the gears 42 and 43 shiftable into mesh with the gears 44 and 45 respectively. The gears 40, 41, 44 and 45 are all secured to a parallel shaft 46 which also has fixed thereto another gear 47 with which meshes the gear 48 of the couplet 50 slidably mounted on the shaft 51. The other gear 49 of this couplet meshes with the gear 41 on shaft 46. By means of the three shiftable couplets 36, 37 and 50 the shaft 51 may be selectively rotated at any one of eight different speeds.

A fourth shaft 52 is journaled in the column parallel to shaft 51 and has another shiftable couplet 53 comprising gears 54 and 55 which are selectively shiftable into engagement with gears 56 and 57 fixed for rotation with shaft 51. Mounted on the shaft 52 is a fixed gear 58 which meshes with the final element 59 of the feed transmission. This element is in the form of a safety gear for permitting slippage in case of extreme overload whereby breakage of the parts may be prevented. This element has clutch teeth 60 formed on one face thereof and is mounted for free rotation on a sleeve 61 in which is journaled shaft 62. This shaft has a bevel gear 63 keyed to the end thereof and forming the final drive member for selectively actuating the saddle, table and knee. The shaft 62 has a clutch spool 64 splined thereon.

The gear 32 constitutes the exterior driving member of a friction disc clutch 65 having pivoted levers 66 adapted to effect engagement of the clutch upon movement of the clutch spool 64 to the left and thereby rotate the shaft 62 at a rapid traverse rate. The clutch spool 64 is also provided with clutch teeth 67 adapted to engage the clutch teeth 60 of the safety gear whereby the shaft 62 may be rotated at any one of the various rates of which the feed transmission is capable.

Figure 9:
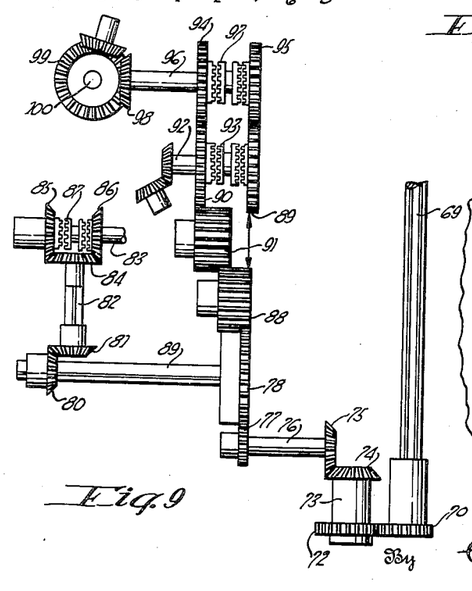
Figure 9 is a detailed view of the transmission to the knee, saddle and table of the machine.

As shown in Figure 4 the bevel gear 63 meshes with a bevel gear 68 secured to the end of a spline shaft 69 which is journaled in the column against axial movement and in telescoping engagement with a spur gear 70 journaled in a bracket 71 carried by the knee as shown in Figure 9. Although the bracket is vertically movable with the knee, it will be apparent that the driving connection between shafts 69 and 70 will be maintained in all relative positions of the parts. the shaft 69 constitutes a common drive member for transmitting selective feed rates or a rapid traverse rate to any one of three branch transmissions mounted in the knee and the corresponding supports coupled with said transmissions.

The various supports are connected to the common drive member 69 through a train of gearing as follows: A spur gear 72 meshes with the gear 70 and is keyed to a vertical shaft 73. This shaft has a bevel gear 74 meshing with a similar bevel gear 75 fixed to the end of a horizontal shaft 76. A pair of gears 77 and 78 connect this shaft to parallel shaft 79 which has slidably splined thereon a bevel gear 80 meshing with bevel gear 81 fixed to the end of shaft 82 which is carried by the saddle. The shaft 82 constitutes a branch transmission for actuating the table. A reversing mechanism is interposed between the shaft 82 and the table feed screw 83 comprising the bevel gear 84 in mesh with a pair of bevel gears 85 and 86 mounted co-axially with the screw 83, and an intervening clutch member 87 selectively shiftable into mesh with gear 85 or gear 86 for coupling one or the other with the feed screw in the usual manner of such reversers.

The gear 78 also acts as a common driver for the branch transmission to the saddle and knee and for this purpose is in constant mesh with a wide-faced pinion 88 which meshes directly with the gear 89 for effecting rotation thereof in one direction and indirectly with a gear 90 through idler 91 for effecting rotation of the gear 90 in a direction opposite to gear 89. The gears 89 and 90 are mounted for free rotation on the saddle actuating shaft 92. Reversing clutch 93 is slidably mounted between these clutch gears for selectively connecting one or the other to the shaft for determining the direction of power movement of the saddle in the conventional manner.

The gears 89 and 90 mesh with gears 94 and 95 respectively, which are mounted for free rotation on an adjacent parallel shaft 96. A clutch member 97 is interposed between these gears for selectively connecting one or the other to the knee drive shaft to effect power elevation or lowering of the knee. The shaft 96 has a bevel gear 98 secured to the end thereof in mesh with the bevel gear 99 keyed to the upper end of the knee elevating screw 100.

One form of transmission mechanism for actuating the three movable supports of a knee and column type milling machine has thus been described which is capable of yielding a plurality of feed rates or a rapid traverse rate and which has a first element for determining between a selected feed rate and a rapid traverse rate as well as additional members respective to the various supports for determining the direction of movement thereof.

A suitable variable speed transmission for the spindle which may be interposed between the spindle and prime mover 20 is shown more particularly in Figure 3. A primary drive shaft 101 is mounted coaxially of the shaft 24 and adapted to be selectively connected thereto by a suitable clutch 102. Mounted on the shaft 101 are the shiftable gear couplets 102 and 103. The first couplet has gears 104 and 105 which may be selectively meshed with gears 106 and 107 mounted on the parallel shaft 108. The couplet 103 has gears 109 and 110 which are adapted to be selectively meshed with gears 111 and 112 fixed on shaft 108. A third shiftable couplet 113 is slidably splined on shaft 114 comprising gears 115 and 116 which are selectively movable into engagement with gears 111 and 117 of shaft 108. A shaft 118 is adapted to be driven from the shaft 114 in either a forward or reverse direction through a reverser interposed between a slidable gear 119 mounted on the shaft 114 and a gear 120 fixed on shaft 118. The reverser mechanism comprises a pair of gears 121 and 122 mounted on an idler shaft 123 in such relation that when the gear 119 is moved to the right or in other words to the position shown in Figure 3, it will mesh directly with gear 120 to effect rotation of the shaft 118 in one direction. Shifting of the gear 119 to the left into mesh with gear 122 causes reverse rotation of shaft 118. A pair of back gears 124 and 125 are slidably mounted on the shaft 118 for selectively engaging gears 126 and 127 fixed to the spindle 15.

This invention deals with improved control mechanism for selecting and varying the rate of rotation of the spindle, and the rate of relative bodily movement between the work and cutter whether at a prescribed feed rate or at a rapid traverse rate, and also certain interlocking mechanism such as means to prevent speed changes of the spindle during rotation thereof, and means to insure non-rotation of the cutter during quick traverse movement of the work. The construction and application of this mechanism to a transmission of a milling machine such as the one just described will now be explained.

This mechanism contemplates the use of power actuated means for shifting the various movable elements of this transmission for effecting prescribed rates of movement thereof. The mechanism for controlling the spindle transmission is more particularly shown in Figures 7, 8 and 10 to which reference may now be had. Electrically actuated units are provided for shifting the various movable gears, it being understood, of course, that the ends of the gear teeth are formed in any well known manner to facilitate gear intermeshing without clashing, such as beveling the ends as shown in United States Patent 1,277,652 or with the ends in staggered overlapping relation as shown in United States Patent 742,812. The gear couplet 124—125 is provided with a shifter arm 128 mounted on the shifter rod 129 which has pole pieces 130 fixed to opposite ends thereof. These pole pieces are slidably mounted in electrical solenoids 131 and 132. Energization of solenoid 132 will cause engagement of gear 124 with gear 126, while energization of solenoid 131 will cause engagement of gear 125 with gear 127. The couplet 113 has a shifter arm 133 fixed to the shifter rod 134 having pole pieces 135 fixed to opposite ends and slidably mounted in solenoids 136 and 137 whereby energization of solenoid 136 will effect engagement of gear 115 with gear 111 and energization of solenoid 135 will effect engagement of gear 116 with gear 107. The couplet 105 has shifter fork 138 fixed to the shifter rod 139 having pole pieces 130 fixed to opposite ends thereof and slidably mounted in solenoids 140 and 141 which, when selectively energized, move gear 104 into engagement with gear 106, or gear 105 into engagement with gear 107.

Figure 10:
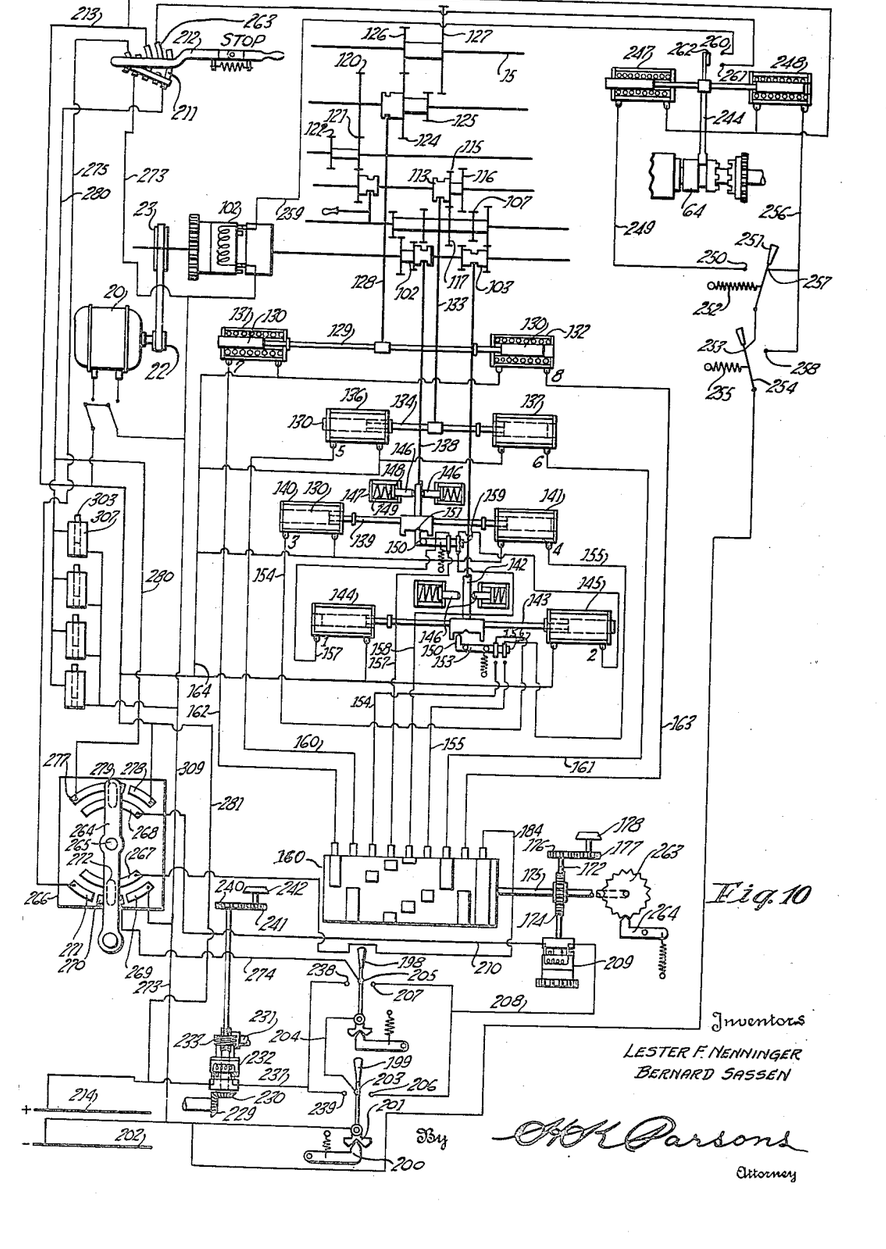
Figure 10 is a diagram of the electrical control circuit for the machine.

The couplet 103 has a shifter fork 142 fixed to shifter rod 143 having pole pieces 130 fixed to opposite ends thereof and slidably mounted in solenoids 144 and 145 to selectively mesh gears 109 and 110 with gears 111 and 112 respectively.

It will be noted that the gears 102 and 103 are slidably mounted on the same shaft and therefore one of these couplets must be in a neutral, or non-power transmitting position, when either gear of the other couplet is in mesh with its respective driven gear. Means have therefore been provided which normally tend to move each of these couplets to a central or neutral position and comprise opposed pairs of spring operated plungers 146, each of which is of the same construction and slidably mounted in spring containing housings 147. The end of each plunger has an enlarged head 148 engaging one end of a spring 149 contained in the housing. It will now be obvious that when no current is flowing in a given pair of solenoids that the springs 149 will come into action and by means of plungers 146 move the couplet to a neutral position. To further assist in centralizing the couplets, a pivoted detent 150 has been provided which is adapted to be forced into a V-shaped notch 151 formed in the shifter fork by a spring 152. It will be noted from Figure 10 that the detent 150 will be oscillated about its pivot pin 153 upon movement of the associated gear couplet into operating mesh. This oscillatory movement is utilized to prevent or delay the energization of either solenoid of a neutralized gear couplet so that this latter couplet will not start to move to a power transmitting position until the other couplet has been withdrawn. To this end controlling circuits 154 and 155 which supply current respectively to solenoids 140 and 141 are adapted to be interrupted by a circuit breaker 156 secured to the end of the detent 150 associated with the couplet 103; and the controlling circuits 157 and 158 are adapted to be interrupted by a circuit breaker 159 connected to the detent 150 associated with the couplet 102. From this it will be seen that when either shifter fork is in a neutral position the controlling circuits to the other pair of solenoids is closed; but when it is in other than a neutral position the circuits to the other solenoids are open.

The solenoids 136 and 137 are provided with control circuits 160 and 161 respectively, while the solenoids 131 and 132 are provided with control circuits 162 and 163 respectively. It will be noted that all of these control circuits are connected to one end of the various solenoids and the actuation is controlled by connecting any of these circuits or conduits to one bus of a common main power line and therefore since it is not necessary to provide a switch in the other side of the line, the opposite ends of the various solenoids are connected in parallel to a common return conduit 164 which is directly connected to the negative bus of the main circuit.

As previously mentioned, it is desirable that the selection of speed rate be determined by power actuated means and to this end a selector switch drum 165 is provided together with means for power rotating the drum. This mechanism is more particularly shown in Figures 4 and 6 and comprises a drive shaft 166 journaled in the interior of the column having a spiral gear 167 fixed at one end thereof in mesh with a similar spiral gear 168 which is keyed to the drive shaft 28 for constant rotation thereby. A pinion 169 is secured to the opposite end of shaft 166 in mesh with gear 170 which gear forms part of an electrically actuated clutch 171. By means of this clutch the gear may be selectively connected to shaft 172 having a spiral gear 173 keyed thereto in engagement with spiral gear 174, this latter gear being fixed to the end of the switch drum shaft 175. A gear 176 is also fixed with shaft 172 in mesh with gear 177 for effecting rotation of an indicator dial 178 mounted on the exterior of the column which, in cooperation with a pointer 179, indicates the speed of the spindle for a given setting of the switch drum. To assist in final positioning of the drum a star wheel 263 is fixed with shaft 172 cooperating with the spring pressed detent 264.

Figure 7:
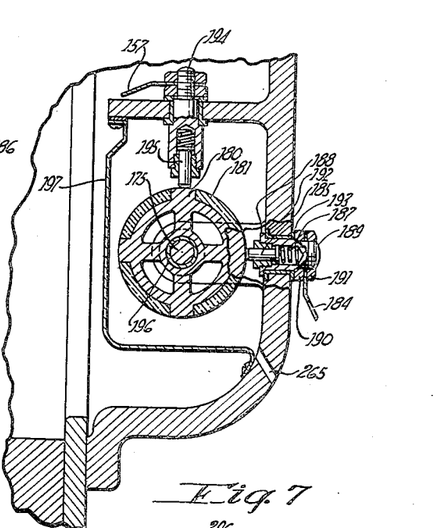
Figure 7 is a section on the line 7—7 of Figure 1.
Figure 8:
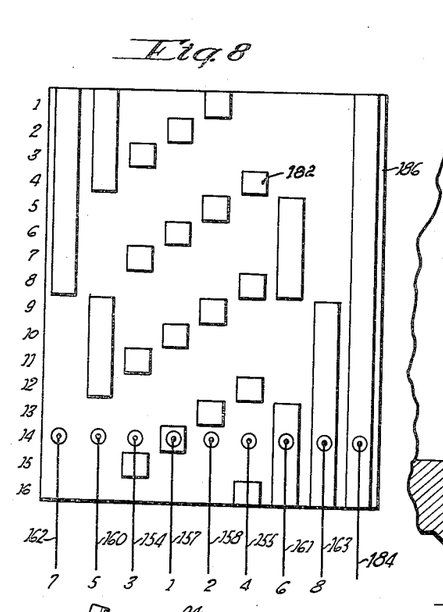
Figure 8 is an expanded view showing the contact strips on the speed rate control drum switch.

The construction and location of the switch drum is shown more particularly in Figures 7 and 8. The switch drum comprises a metallic shell 180 of electrical conducting material having a series of depressions formed therein, which are filled with a non-conducting or insulating material 181 resulting in the formation of contact strips 182 on the periphery of the drum. These contact strips are made of various lengths corresponding to the positions that the various shifter couplets assume, and also in such succession that one rotation of the drum will effect a progressive change of speed of the spindle from the lowest to the highest. For instance, in the first position of the drum as indicated in Figure 8, the controlling circuits 162, 160 and 158 will be energized thereby shifting gear 109 into engagement with gear 111; gear 116 into engagement with gear 107; and gear 125 into engagement with gear 127. This position corresponds to the lowest speed of the transmission. It will be noted that the contact strip 182 is of sufficient length that the gear 125 will remain in engagement with gear 127 during the first half of a revolution of the drum during which time the eight different speeds of which the couplets 102, 103 and 113 are capable of, will be effected. After this, the contact strip 183 will energize circuit 163 and the circuit 162 will be disconnected during the remaining half of the revolution of the drum. This will shift the gear 124 into engagement with gear 126 and the remaining shiftable couplets will execute another series of speeds in progressive succession with the first series. A conduit 184 is continuously electrically connected to the drum by means of a brush 185 maintained in engagement with the contact strip 186 by a spring 187. The brush is slidably mounted in a bushing 188 which is threaded in the end of a hollow bolt 189 which is threaded at the outer end for receiving locking nuts 190 and 191 by means of which the conduit 184 is connected to the bolt. An insulating bushing 192 and an insulating washer 193 prevent grounding of the bolt through the frame of the machine.

Each of the solenoid controlling circuits is similarly connected to a bolt 194 having a spring pressed brush 195 in the end thereof contacting the periphery of the drum. The shell 180 is insulated from its supporting shaft 175 by the bushing 196 which is formed of insulating material. The drum switch and contacts are inclosed in a suitable housing 197 which is substantially oil-tight and water-tight to protect the parts and prevent grounding thereof. If desired holes 265 may be drilled in the bottom of the bracket to permit drainage of leakage and also to act as ventilating means for the compartment.

Power rotation of the drum is controlled by dual switches 198 and 199 which may be mounted at spaced points on the machine. In the present instance the switch 198 is mounted on the knee and the control switch 199 is mounted on the column whereby the selection of spindle speed may be controlled from the operator's normal position at the front of the machine, or selectively from a position at the rear of the saddle and table. Since the rotation of the drum and the selection of the spindle speed is only a momentary affair, each of the switches is provided with a spring pressed detent 200 engaging V-shaped notch 201 formed in the end of the switch lever which tends to normally maintain it in a central position.

The switches are connected in series, the main bus 202 being directly connected to switch lever 199 and when this lever is in a central position it connects this line to contact point 203 which is connected by line 204 to switch lever 198. When this lever is in a central position it engages a contact point 205. The switch 199 is provided with a contact point 206 and the switch 198 with contact point 207 which contact points are connected to control conduit 208 extending to the electrical clutch 209 for determining rotation of the drum switch.

Means have also been provided for power shifting the various gear couplets of the feed transmission comprising a plurality of cams, such as shown in Figure 5. A shaft 215 is provided with a cam 216 having a properly configured cam path 217 formed therein for receiving a roller 218 mounted on one end of a pivoted shifter fork 219 which engages the gear couplet 36. A second cam 220 is mounted on the shaft for controlling the movements of a shifter fork 221 connected to the couplet 37. The configuration of the cam paths of these two cams is such that one revolution of the shaft will effect in succession the four positions which the two couplets are capable of. The shaft 215 is connected by gears 222 and 223 to a parallel shaft 224. This shaft has two cams 225 and 226 fixed thereto which have suitable cam paths formed therein for controlling the movement of shifter forks 227 and 228 respectively to thereby shift the gears of the couplets 50 and 53 into the four different positions which these couplets are capable of. The gears 222 and 223 are in the ratio of 1 to 2 so that one rotation of shaft 225 will effect two rotations of shaft 215. This makes it possible for one of the couplets 53 to assume one position, while the couplet 50 is shifted to its two positions during one-half of a revolution of the shaft 225 and while the couplets 36 and 37 are successively shifted to their four positions during one revolution of shaft 215 thereby effecting eight different feed rates and a repetition of this during the other half revolution of the shaft 225 to effect the sixteen speeds which this particular feed transmission can yield. A detent means 225' holds the cams in their various positions.

Figure 6:
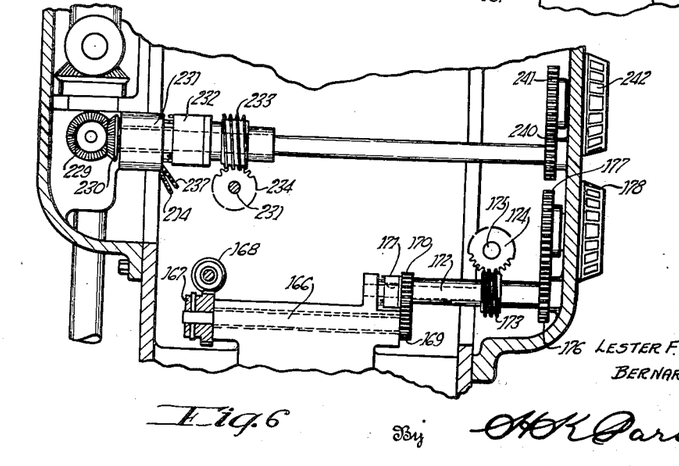
Figure 6 is a detailed section through the column showing the drive mechanism for power operating the speed and feed rate determining members.

The shaft 225 is connected by bevel gears 229 and 230 to shaft 231 which, as shown in Figure 6, is provided with an electrically operated clutch 232. A spiral gear 233 is mounted for free rotation on this shaft in engagement with spiral gear 234 which is connected by a pair of spur gears 235 and 236 to the drive shaft 31 as more particularly shown in Figure 4. Since the shaft 31 is continuously rotated during operation of the prime mover, the gear 233 will also be continuously rotated so that at any time upon energization of clutch 232, the feed shifter cams previously described will be rotated. The clutch 232 as shown in Figure 10, is provided with a controlling circuit 237 which terminates in contact points 238 and 239 forming parts of switches 198 and 199 respectively. This makes it possible to selectively control the speed change or feed change by either of these switches and thus form different operating stations at the machine. Movement of the switch to the right as shown in Figure 10 will effect rotation of the speed determining switch, while movement of the switch to the left from its central position will effect rotation of the feed rate controlling cams.

The shaft 231 is extended across the column and connected by spur gears 240 and 241 to the feed rate dial 242 mounted on the exterior of the column which cooperates with a pointer 243 to indicate the various rates as they are effected by the rate change mechanism.

Figure 1:
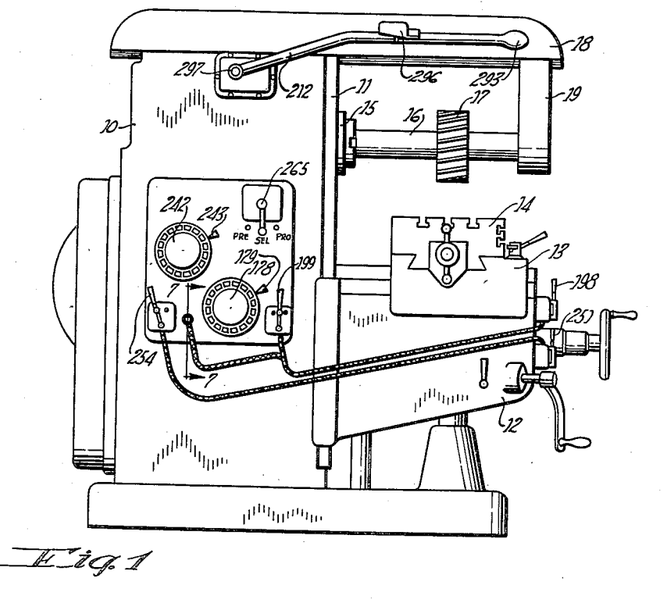
Figure 1 is a side elevation of a milling machine embodying the principles of this invention.
Figure 2:
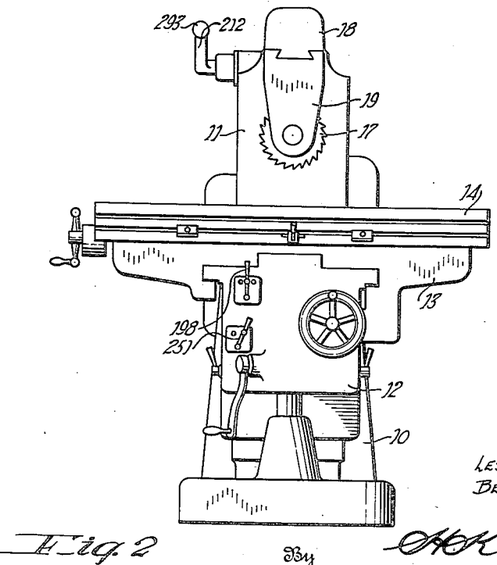
Figure 2 is an elevation of the machine as shown in and as viewed from the right of Figure 1.

Suitable control means have also been provided for shifting the feed-rapid traverse clutch 64 as shown more particularly in Figures 4 and 10. A shifter fork 244 engages the clutch spool 64 and is fixed to a shifter rod 245 having pole pieces 246 fixed to opposite ends thereof and slidably mounted in solenoids 247 and 248. Energization of solenoid 247 will cause engagement of clutch teeth 67 with clutch teeth 60 and thereby rotation of the shaft 62 at a feed rate, while energization of solenoid 248 will shift the clutch spool in the opposite direction and couple shaft 62 to the rapid traverse transmission. The solenoid 247 is provided with a controlling circuit 249 which terminates at the contact point 250 of the rate control switch 251. It is desirable that the feed clutch be engaged at all times and to this end the solenoid 247, which effects the feed rate, should normally be energized at all times and therefore a spring 252 is provided for normally maintaining the switch 251 into engagement with the contact 250. The switch 251 is connected in series with contact 253 of switch 254, switch lever 254 being connected to the main bus line 202. A spring 255 maintains the switch 254 normally in engagement with contact 253. With this arrangement of parts it will be noted that electrical energy is normally supplied to solenoid 247 so that the feed clutch may be held engaged. The solenoid 248 which determines rapid traverse is connected by the controlling circuit 256 in parallel to contacts 257 and 258, of switches 251 and 254 respectively. This makes it possible to effect rapid traverse by throwing either one of these switches to the right as viewed in Figure 10. These switches may be placed at spaced points on the machine, the switch 251 in this case being mounted on the knee as shown in Figure 1, and the switch 254 being mounted on the column of the machine.

In accordance with general practice, it is desirable that the cutter spindle be stationary during rapid traverse movements of the work support and to this end interlocking mechanism has been provided whereby the clutch 102 which determines rotation of the spindle will be de-energized whenever the rapid traverse clutch is engaged. To this end the controlling circuit 259 is interrupted to form two switch points 260 and 261 which are adapted to be closed by a contact strip 262 carried by the shifter fork 244. From Figure 10 it will be noted that when the feed-rapid traverse control clutch 64 is moved to the right or to a feed position, the circuit 259 will be closed and when moved to rapid traverse position the circuit will be open.

Changes in speed rate may be effected in three different manners or systems of operation, usually termed progressive, selective and preselective. The progressive system of power rate change may be defined as a system wherein the power shifting means is active throughout the movement of a control member so that as the controlling member moves through each successive position corresponding to a definite series of rates, the movable members of the transmission will assume successively their respective positions in accordance with each rate until the final prescribed rate is reached.

The selective method of operating a power rate changer involves a system wherein the power shifting means is automatically disconnected or rendered inactive during movement of a control member from one speed position to a desired speed position which means that the shiftable elements of the transmission remain stationary until the final desired speed position is reached by the control member, at which time the power shifting means then comes into action to move the shiftable members of the transmission to their positions corresponding to the rate selected.

This system differs from the first in that only one repositioning operation of the shiftable members of the transmission takes place, while in the former system several repositioning operations occurred which depended upon the number of intervening rate positions between the initial position and the desired position.

A third system of operation known as preselective, may be defined as a system wherein the control member is first moved to a desired rate position while the transmission members remain stationary, or in other words the desired rate is selected first and then separate means are provided for selectively coupling the power shifting means to the shiftable members at any later time, and at the will of the operator.

The present control mechanism is designed to operate under any one of these systems and the various control parts previously described are connected to a single switch mechanism which may be moved to any one of three positions to connect the various switches and operated parts in such relation that operation under any one of these three systems is possible. This switch member comprises a lever 264 pivoted at 265 for movement over a plate 266 having two concentric series of contact strips. The contact segment 267 is connected to control circuit 184 for the switch drum, while the contact segment 268 is connected to the return line 210 of the selective control clutch 209.

Figure 12:
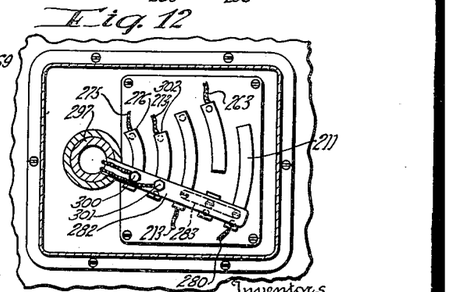
Figure 12 is a view of the control switch associated with the starting lever.

Three segments 269, 270 and 271 are arranged concentric to the segment 267 for connection therewith by a connector strip 272 carried by the lever 264. The segment 269 is connected to the negative power line 273. The segment 270 is connected by line 274 to the switch point 205. The segment 271 is connected by line 275 to contact strip 276 as shown in Figure 12. A pair of segments 277 and 278 are arranged concentric to the segment 268 for connection thereto by connector strip 279 carried by the lever 264. The segment 277 is connected by line 280 to contact strip 211 of the switch shown in Figure 12. The contact 278 is connected to the positive power line 281.

When the lever 264 is moved to the right from the position shown in Figure 10 the power from negative line 273 is connected through contacts 269, 272 and 267 to the control circuit 184 of the switch drum. This means that electrical energy is being supplied continuously to the electrical solenoids so that any movement of the control drum relative to the contacts shown in Figure 8 will cause a repositioning of the shiftable members of the transmission. Also this position of the switch lever 264 connects the return line 210 from the clutch 209 to the contact 211 which is connected as shown in Figure 12 to the positive power line 213. The control lever 212 has the switch arm 282 connected therewith which has a metallic strip 283 fastened thereto for electrically connecting strip 211 to the strip 213. The clutch 209 is therefore connected to the positive power line through conductor 210, which means that any time either of the switches 198 or 199 are moved to the right as shown in Figure 10 that the drum switch will be rotated and since the control circuit 184 is also continuously connected to the negative power line 202, any rotation of the drum will immediately effect shifting of the movable members of the transmission. When the switch lever 264 is moved to a central position, or in other words to the position as shown in Figure 10, the control circuit 184 of the switch drum is connected through contacts 267, 272 and 270 to line 274 terminating in contact 205 and subsequently contact 203. The return line 210 is still connected as before to the main power line so that upon movement of either switch lever 198 or 199 the electrical energy to the control drum switch is disconnected and will remain so as long as either of these switches engage their respective contacts 207 and 206. In other words, during rotation of the control drum there is no electrical energy available for shifting the clutches and the shiftable members of the transmission remain in their various positions until final positioning of the drum. Return movement of the switch levers 198 or 199 will reconnect the control circuit 184 to power and thereby energize the various solenoids and effect one repositioning of the various shiftable members into the final rate position desired.

Figure 11:
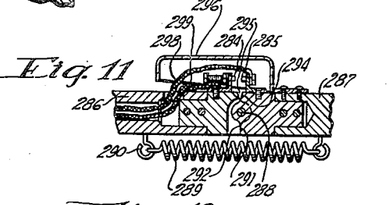
Figure 11 is a detail section of the power control switch for preselective operation associated with the two-part starting lever.

Movement of the lever 264 to its extreme left position will connect the control circuit 184 of the switch drum to line 275 which in turn is connected to contact 276 as previously explained. Also the return line 210 from clutch 209 will be directly connected by line 281 to the negative bus line 202 so that upon any time that the switches 198 or 199 are moved to the right rotation of the switch drum will take place. Since the line 274 is now dead, return movement of the switch lever will not re-connect power to the switch drum. This is effected by an additional switch which may be selectively operated at any later time and at the will of the operator. This switch is shown in Figure 11 and comprises a pair of spaced contacts 284 and 285 carried by two relatively movable parts 286 and 287 forming the control lever 212. These parts are pivotally connected together by a pin 218 and are held in a coaxial position by a spring 289 connected at opposite ends to the respective parts as by hooks 290. The member 287 is urged in a clockwise direction about the member 286 but restrained against movement beyond the position shown by abutment 291 engaging abutment 292 on member 286. The member 287 may be moved in a counter-clockwise direction against the urge of spring 289 by the operator grasping the grip 293 formed on the end of part 287 and pushing upward thereon. This movement will be limited by abutment 294 on part 287 engaging abutment 295 on member 286. When these latter abutments engage, the contact 284 is adjusted so as to touch contact 285. A shield 296 may be secured to one of the members to protect the contacts from dust and dirt. It will now be seen that upward movement of the pivoted member 287 will close the circuit to the drum and continued pressure will cause the part 286 to rotate about its pivot 297 as shown in Figure 12 and move the switch arm 282 upward. When the switch arm has moved to its upper limit, that is, to the running position, a release of the part 287 by the operator will permit the spring 289 to come into action and separate the contacts 284 and 285.

These contacts are connected by conductors 298 and 299 to contact shoes 300 and 301 carried by the switch arm 282 engaging contact strips 276 and 302 respectively. It will be noted that the contact strip 302 is shorter than the contact strip 276 so that when the switch arm reaches its upper limit of movement the circuit will be broken even although the contacts 284 and 285 are still in engagement. This prevents the possibility of the operator preselecting a new position and establishing contact between the points 284 and 285 while the machine is running. In other words, the lever 212 must be pulled downward to a starting position at which time the starting clutch 102 will be disengaged and power disconnected from the spindle transmission. The control circuit 259 for the clutch 102 is connected to contact strip 253 which is sufficiently short to prevent energization of clutch 102 a sufficient length of time so that the solenoids will be energized and will be urging the various gears into mesh before the parts start to rotate.

As previously explained, the energy is disconnected from the solenoids during preselective operation of the system and therefore means have been provided for positively maintaining the gears in mesh even although the solenoids are not energized. This mechanism comprises a solenoid operated locking pin 303 cooperating with a pair of drilled holes 304 and 305 formed in the various shifter forks. The pin is normally forced into one or the other of these holes by a spring 306. These pins are indicated diagrammatically in Figure 10 and each is provided with an operating solenoid 307, the solenoids being connected in parallel to a common power supply line 308 which is connected to a contact strip 211 of the switch shown in Figure 12. The opposite ends of each solenoid are connected in parallel to the return line 309 leading to the negative bus 202. The contact strip 211, it will be noted, is cut short so that upon movement of the switch arm to its extreme position the solenoids will be de-energized to permit return movement of the pins. This strip, however, is long enough to maintain the pins retracted a sufficient length of time for the solenoids to effect initial movement of the shifter sufficiently to prevent premature return of the pins. The shifter forks 128 and 133 only have two positions and are therefore only provided with two pin receiving holes while the shifters 138 and 142 have three positions and are therefore provided with an additional drilled hole 310 to maintain them in a neutral position.

The circuit 259 terminates in switch points 263 for engagement by the starting control switch lever 212. When this lever is moved upward from the position shown in Figure 10, the circuit will be closed as far as switch point 261 and if the clutch 64 is in feed position it will be closed through the magnetic clutch 102 and thereby to bus 202.

If so desired, the feed transmission may be electrically shifted in a similar manner to that shown for the speed transmission instead of mechanically shifted. In such case each shiftable unit would be provided with a pair of operating solenoids such as shown in connection with the speed transmission in Figure 10 and these solenoids would have control circuits connected to a second drum switch 311 as shown in Figure 14 which drum switch would be rotated from the power shaft 231 through bevel gears 230 and 229. The control circuits 312 and 313 would control gear couplet 53; circuits 314 and 315 would control gear couplet 50; circuits 316 and 317 would control gear couplet 37, and circuits 318 and 319 would control gear couplet 36. Power would be continuously supplied to the drum from bus 202 through line 320, and all the return lines would be connected to the common return line 321 connected to the other main bus 214.

A control mechanism has thus been provided for the transmission of a milling machine comprising easily movable switches for selectively determining the feed and speed rates of the tool and work as well as selection between feed and rapid traverse rates, together with interlocking mechanism which prevents rotation of the spindle during rapid traverse movements of the work support or changes in rate of the spindle while the same is rotating.

What is claimed is:

1. In a milling machine having a column, a cutter spindle journaled in the column and a work support movable transversely of the spindle, the combination of transmission means for effecting movement of the work support at a feed or quick traverse rate including a prime mover, a first train actuated by the prime mover, a rate changer mechanism associated with the train and selectively positionable to cause the train to yield a plurality of relatively slow rates, a second train driven by the prime mover at a constant rate which is faster than any rate yieldable by the first train, an ultimate train extending to the work support, a clutch shiftable for coupling the first or second train to the ultimate train thereby to determine between feed and quick traverse movement of the work support, an electro-responsive unit for shifting the clutch to a feed position, a second electro-responsive unit for shifting the clutch to a quick traverse position, a control switch including a lever having a first position for energizing the first unit, means normally maintaining the lever in said position, said lever being also manually movable against the effort of said retaining means to a second position to de-energize the first unit and energize the second unit whereby the support will move at a quick traverse rate.

2. In a milling machine having a column, a cutter spindle journaled in the column, and a work table supported by the column for movement transversely of the spindle, the combination of transmission means for effecting movement of said support at a plurality of slow rates or at a relatively fast rate comprising a prime mover, a first train actuated by the prime mover, a rate change mechanism associated with the train and selectively positionable to effect a plurality of slow rates, a second train driven by the prime mover at a constant relatively fast rate, an ultimate train extending to the work support, a clutch for selectively coupling the first or second train to the ultimate train, an electro-responsive unit for shifting the clutch to a rapid traverse position, a control switch including a lever movable to one position to energize said unit and resiliently active means effective to cause movement of the clutch to a feed position upon release of said lever by the operator.

3. A milling machine having a column, a cutter spindle rotatably mounted in the column for actuating a cutter arbor, a work support mounted on the column for movement transversely of the arbor, an overarm extending from the column transversely of the work support for supporting said arbor, a transmission for the machine including a prime mover, a first train for actuating one of said movable parts, a clutch for selectively coupling the train to the prime mover, a second train for actuating the other movable part and connected to the prime mover exclusive of said clutch, electro-responsive means for engaging and disengaging said clutch, a control switch mounted on the column, said switch having a first position for energizing said electro-responsive means and a second position for de-energizing said means, and means for moving said switch including an elongated control lever extending substantially parallel to the overarm, and to the side of the work support opposite to the column whereby the switch may be operated from a position at the front of the machine.

4. In a milling machine having a support, a tool spindle movably mounted in the support, and a work table carried by the support for movement transversely of the spindle, the combination of a transmission for effecting one of said movements, said transmission including a plurality of shiftable units selectively positionable to yield a plurality of rates at which said movement shall take place, electrical solenoids associated with said units for power shifting the same, a control drum switch, separate control circuits connecting the respective solenoids to the switch, said drum having separate contact strips thereon for controlling energization of each circuit, a pair of electrical supply conduits, means to couple one conduit to said contact strips, and means to couple the return circuit from the respective solenoids directly to the other conduit, means to move said switch to different positions to obtain each one of said plurality of rates and detent means for holding the switch in its various positions.

5. In a milling machine having a support, a tool spindle movably mounted in the support, and a work table carried by the support for movement transversely of the spindle, the combination of a transmission for effecting one of said movements, said transmission including a plurality of shiftable units selectively positionable to yield a plurality of rates at which said movement shall take place, electrical solenoids associated with said units for power shifting the same, a control drum switch, separate control circuits connecting the respective solenoids to the switch, said drum having separate contact strips thereon for controlling energization of each circuit, a pair of electrical supply conduits, means to couple one conduit to said contact strips, means to couple the return circuit from the respective solenoids directly to the other conduit, a power driven shaft, gearing coupling the shaft to the drum for effecting rotation thereof, a dial for indicating the position of the drum, and gearing coupling the dial to said shaft whereby the drum switch and dial will be simultaneously actuated.

6. In a milling machine having a support, a tool spindle movably mounted in the support, and a work table carried by the support for movement transversely of the spindle, the combination of a transmission for effecting one of said movements, said transmission including a plurality of shiftable units selectively positionable to yield a plurality of rates at which said movement shall take place, electrical solenoids associated with said units for power shifting the same, a control drum switch, separate control circuits connecting the respective solenoids to the switch, said drum having separate contact strips thereon for controlling energization of each circuit, a pair of electrical supply conduits, means to couple one conduit to said contact strips, means to couple the return circuit from the respective solenoids directly to the other conduit, a power driven shaft, gearing coupling the shaft to the drum for effecting rotation thereof, a dial for indicating the position of the drum, gearing coupling the dial to said shaft whereby the drum switch and dial will be simultaneously actuated, a source of power, a magnetic clutch for coupling said shaft to the source of power, and remote control means adjacent said work table for determining operation of the clutch.

7. In a milling machine having a support, a tool spindle movably mounted in the support, and a work table carried by the support for movement transversely of the spindle, the combination of a transmission for effecting one of said movements, said transmission including a plurality of shiftable units selectively positionable to yield a plurality of rates at which said movement shall take place, electrical solenoids associated with said units for power shifting the same, a control drum switch, separate control circuits connecting the respective solenoids to the switch, said drum having separate contact strips thereon for controlling energization of each circuit, a pair of electrical supply conduits, means to couple one conduit to said contact strips, means to couple the return circuit from the respective solenoids directly to the other conduit, a power driven shaft, gearing coupling the shaft to the drum for effecting rotation thereof, a dial for indicating the position of the drum, gearing coupling the dial to said shaft whereby the drum switch and dial will be simultaneously actuated, a source of power, a magnetic clutch for coupling said shaft to the source of power, remote control means adjacent said work table for determining operation of the clutch including a control circuit for the clutch, dual switches mounted in opposite sides of the table, and means to connect the control circuit to said switches in parallel.

8. In a milling machine having a support, a tool spindle movably mounted in the support, and a work table carried by the support for movement transversely of the spindle, the combination of a transmission for effecting one of said movements, said transmission including a plurality of shiftable units selectively positionable to yield a plurality of rates at which said movement shall take place, electrical solenoids associated with said units for power shifting the same, a control drum switch, separate control circuits connecting the respective solenoids to the switch, said drum having separate contact strips thereon for controlling energization of each circuit, a pair of electrical supply conduits, means to couple one conduit to said contact strips, means to couple the return circuit from the respective solenoids directly to the other conduit, a power driven shaft, gearing coupling the shaft to the drum for effecting rotation thereof, a dial for indicating the position of the drum, gearing coupling the dial to said shaft whereby the drum switch and dial will be simultaneously actuated, a source of power, a magnetic clutch for coupling said shaft to the source of power, remote control means adjacent said work table for determining operation of the clutch including a control circuit for the clutch, dual switches mounted in the opposite sides of the table, means to connect the control circuit to said switches in parallel, said switches being connected in series to one of said supply conduits, means normally maintaining one switch in a position to connect the supply conduit to the second switch whereby movement of the first switch to a circuit coupling position will disconnect power from the second switch.

9. In a milling machine having a column, a cutter spindle rotatably movable in the column, and a work support carried by the column for movement transversely of the spindle, the combination of transmission and control mechanism for the spindle including a prime mover, a variable speed transmission extending to the spindle, a first magnetic clutch for coupling the variable speed transmission to the prime mover, a speed change mechanism associated with the transmission, a branch transmission for power actuating the speed change mechanism, a second magnetic clutch for coupling the speed change mechanism to the branch transmission, a control circuit for the first magnetic clutch including a starting switch, a control circuit for the second magnetic clutch, and means to break the second control circuit upon movement of the starting switch to close the first control circuit.

10. In a milling machine having a column, a cutter spindle rotatably movable in the column, and a work support carried by the column for movement transversely of the spindle, the combination of transmission means for effecting both of said movements including a prime mover, a first train connected thereto for moving the spindle, a second train connected to the prime mover for actuating the work support, a speed change mechanism associated with the first train, a rate change mechanism associated with the second train, a pair of branch transmissions for operating the respective change mechanisms including magnetic clutches for connecting either branch transmission with its respective change mechanism, a control circuit for each magnetic clutch, a common control switch for energizing either circuit including a lever, means normally maintaining the lever in a central position, and means for moving the switch to opposite sides of its central position for selectively closing either circuit.

11. In a milling machine having a support, a tool spindle journaled in the support, and a work table carried by the support for movement transversely of the spindle, the combination of transmission and control mechanism for the spindle including a prime mover, a variable speed transmission, a main clutch for coupling the transmission to the prime mover, a speed change mechanism associated with the transmission and including electrically operated means for moving the shiftable members of the variable speed transmission, a control switch drum, control circuits extending from the drum to the various electrically operated means, a branch transmission continuously operated by the prime mover, a magnetic clutch for coupling the branch transmission to the drum to effect power rotation thereof, a source of electrical energy, a common supply line therefrom for operating said clutch and said electrically operated devices, and means for automatically breaking the circuit to the control drum upon energization of the drum control clutch whereby the shiftable members of the transmission will not be moved during rotation of the drum.

12. In a transmission having a driving shaft and a driven shaft and a pair of independently movable gear couplets on one shaft for selective engagement with a plurality of gears fixed on the other shaft, the combination of control mechanism for selectively shifting one pair of gears into mesh while maintaining the gears of the other couplet in a neutral position including a pair of operating solenoids associated with each couplet, each of said couplets having a neutral position and a power transmitting position on either side thereof, individual control circuits for the various solenoids, means operable by the shiftable member associated with one pair of solenoids upon movement to either of its power transmitting positions to break the control circuit to the other pair of solenoids, and means operable by the shiftable member on movement to a neutral posiof members whereby the other shiftable member may only be actuated when the first shiftable member is in a neutral position.

13. A milling machine having a column, a cutter spindle journaled in the column, a work support mounted on the column for movement transversely of the spindle, transmission means for rotating the spindle and translating the work support including a prime mover, a variable speed transmission extending from the prime mover to the spindle including a magnetic clutch for connecting and disconnecting the transmission, a feed transmission and a rapid traverse transmission connected to the prime mover exclusive of said clutch, a shiftable member for selectively coupling either of the last named transmissions to the work support, a control circuit for said magnetic clutch, and means operable by said shiftable member upon movement to a quick traverse position to break said circuit and thereby stop rotation of the spindle during rapid traverse movement of the table.

14. A milling machine having a column, a cutter spindle journaled in the column, a work table supported by the column for movement in a direction transverse to the spindle, means to actuate said parts including a prime mover, a spindle transmission, a magnetic clutch for coupling the transmission to the prime mover, a control circuit for the clutch including a switch, said switch having two positions, one of which serves to couple a source of electrical energy to the control circuit, an electrically operated rate change mechanism associated with the transmission including a control switch drum, a second magnetic clutch for determining power rotation of said drum switch, a control circuit for the second clutch, said last named circuit being in series with the starting switch for energization during rotation of the spindle, a feed-rapid traverse transmission for the table, a selector member for coupling either transmission to the table, and means associated with the rate selector for breaking the control circuit of the spindle transmission clutch upon movement of the selector to a rapid traverse position.

15. In a machine tool having a support, a cutting tool movably mounted therein and a work table carried by the support for movement transversely of the tool, the combination with a prime mover and a variable speed transmission having shiftable members for effecting one of said movements at different rates, of a rate change mechanism including power energizable units for shifting said members, a source of energy therefor, a unit selector device, an actuator constantly driven by the prime mover, a manually operable lever having a first position for coupling said actuator to the selector device for positioning the same and thereby determining the units to be energized, a system selector control member movable to a first position for coupling the source of energy directly to said selector device whereby upon power actuation thereof the mechanism will operate under the progressive system of rate changing; to a second position for coupling the source of energy in series with the manually operable control lever whereby manual movement of said lever to a second position will effect energization of said units and thereby operation of the mechanism under the selector system of rate changing; and an auxiliary control member between the source of energy and the system selector control member; said selector control member being movable to a third position to couple the auxiliary control member in series with the unit selector member whereby energy will only be supplied to said units upon wilful operation of the auxiliary control thereby causing the mechanism to operate under the preselector system of rate changing.

16. In a machine tool having a support, a cutter spindle journaled in the support and a work table movable transversely of the spindle, the combination with a variable speed transmission having shiftable members for effecting rotation of the spindle, of a speed change mechanism for the transmission including electro-actuated units for shifting said members, a source of electrical energy therefore, a rotatable drum switch, a constant power driven member, a manually operable control lever movable to a first position for coupling the power drive to the drum switch for rotatably positioning the same to determine the units to be energized by said source, a system selector control member movable to a first position for connecting the source of electrical energy directly to the drum switch whereby power rotation of the drum will cause the mechanism to operate under the progressive system of rate changing; to a second position for coupling the source of electrical energy in series with the manually operable control lever whereby manual movement of said lever to a second position will connect the drum switch and thereby said units to the source causing the mechanism to operate under the selective system of rate changing; and an auxiliary switch; said selector control member being movable to a third position to couple the auxiliary switch in series between the source of electrical energy and the drum switch whereby said units will only be operated upon wilful closing of the auxiliary switch thereby causing the mechanism to operate under the preselector system of rate changing.

17. In a machine tool having a column, a cutter spindle journaled in the column and a work support movable transversely of the spindle, the combination of a variable speed transmission having shiftable members for effecting rotation of the spindle at different rates, a rate change mechanism for shifting said members including a plurality of power energizable units, a source of energy therefore, a unit selector member, a power driven member, a manually operable control for coupling the power drive to the unit selector for determining the units to be energized, a system selector control member movable to a first position for coupling the energy source to the unit selector whereby power actuation of the unit selector will cause the mechanism to operate under the progressive system of rate changing; to a second position for coupling the source of energy for control by the manually operable lever whereby manual movement of the lever to a second position will couple said source to the unit selector causing the mechanism to operate under the selector system of rate changing; a prime mover for the transmission, a starting control lever for coupling the prime mover to the transmission, means operable by the starting lever for rendering the manually operable control lever ineffective during actuation of the variable speed transmission; and an auxiliary control switch; said system selector control member being movable to a third position to couple the auxiliary switch in series between the source of energy and the unit selector member whereby the units will only be energized upon wilful closing of the auxiliary switch, said third position of the system selector also rendering the manually operable control effective for positioning the unit selector independent of the position of the starting control lever.

18. In a machine tool having a movable cutter spindle and work support, the combination with a variable speed transmission for effecting one of said movements, said transmission including a plurality of shiftable units for varying the ultimate yielded rate of a plurality of power actuated members for shifting said units, a blocking mechanism associated with each unit, said mechanisms including means for normally holding the units in their various positions, a prime mover, clutch means for coupling the prime mover to the transmission including a control lever movable from a first position to a second position to effect operation of the clutch, and power means operable by the lever upon movement from the second position to the first position to unlock said mechanisms whereby the shiftable units may be moved when the transmission is idle.

19. In a milling machine having a support, a tool spindle movably mounted in the support and a work table carried by the support for movement transversely of the spindle, the combination of a transmission for effecting one of said movements, said transmission including a plurality of units selectively positionable to yield a plurality of rates, electrical solenoids associated with the respective units for power shifting the same, a control drum switch, separate control circuits connecting the respective solenoids to the switch, separate contact strips on the drum for controlling each circuit, a pair of electrical supply conduits, means coupling one conduit to said contact strips and the other conduit directly to said solenoids, a power driven member, clutch means including a control lever for coupling the member to the drum switch for rotation thereby whereby the units will successively assume positions corresponding to the various rates during rotation of the drum switch.

20. In a milling machine having a support, a tool spindle movably mounted in the support and a work table carried by the support for movement transversely of the spindle, the combination of a transmission for effecting one of said movements including a plurality of units selectively positionable to yield a plurality of rates, a plurality of electrical solenoids for power shifting said units, a control drum switch, individual control circuits connecting the switch to the respective solenoids, said drum having individual contact strips for each circuit, a pair of electrical supply conduits, means coupling one conduit to said contact strips, means coupling the other conduits to the solenoids, a power driven shaft, a gear train including a clutch for coupling the shaft to the drum for power positioning the same whereby the units will be shifted progressively to the various rate change positions during rotation of the drum, and a dial operatively connected with the drum for indicating the instant rate position of the drum.

21. In a milling machine having a support, a tool spindle movably mounted in the support and a work table carried by the support for movement transversely of the spindle, the combination of a transmission for effecting one of said movements, including a plurality of shiftable units selectively positionable to yield a plurality of rates, a plurality of electrical solenoids for power shifting said units, a control drum switch, individual control circuits extending from the switch to the respective solenoids, said drum having individual contact strips for each circuit, a pair of electrical supply conduits, means coupling one conduit to said contact strips, means coupling the other conduit to the solenoids, a power driven shaft, a gear train including an electrically operated clutch for coupling the shaft to the drum for power positioning thereof whereby the units will be shifted progressively to various rate positions, a dial operatively connected with the drum for indicating the instant rate position thereof, a prime mover, a starting control lever movable from a first position to a second position for coupling the prime mover to the transmission and simultaneously breaking the circuit to said clutch thereby rendering it inoperative during actuation of the transmission.

22. In a milling machine having a support, a tool spindle movably mounted in the support and a work table carried by the support for movement transversely of the spindle, the combination of a transmission for effecting one of said movements, said transmission including a plurality of shiftable units selectively positionable to yield a plurality of rates, a plurality of electrical solenoids for power shifting said units, a control drum switch, individual control circuits extending from the switch to the respective solenoids, said drum having individual contact strips for each circuit, a pair of electrical supply conduits, means to couple one conduit to said contact strips, means to couple the other conduit to the solenoids, a power driven shaft, a gear train including a clutch for coupling the shaft to the drum whereby the units will be shifted progressively to the various rate positions during rotation of the drum, a dial operatively connected to the drum for indicating the instant rate position thereof, a prime mover, a starting control lever movable from a first position to a second position for coupling the prime mover to the transmission and simultaneously preventing operation of the clutch during actuation of the transmission, detent mechanism for locking said shiftable units in their various positions during actuation of the transmission, and means operable by the starting lever upon return movement to its first position to unlock said detent mechanism and permit shifting of the units during non-actuation of the transmission.

23. In a milling machine having a support, a tool spindle journaled in the support and a work table carried by the support for movement transversely of the spindle, the combination of transmission and control mechanism for the spindle including a prime mover, a variable speed transmission, a main clutch for coupling the transmission to the prime mover, a speed change mechanism including shiftable members associated with the transmission, electrically operated means for shifting said members, a control switch drum, control circuits extending from the switch to the various electrically operated means, a branch transmission continuously operated by the prime mover, a magnetic clutch for coupling the branch transmission to the drum for power rotation thereof, a source of electrical energy, a common supply line for operating said clutch and energizing said shifting means, means for automatically breaking the circuit to the drum upon energization of the magnetic clutch, control means for the main clutch, and means operated by said control means for interrupting the circuit to the magnetic clutch during actuation of the transmission.

24. In a milling machine having a support, a tool spindle journaled in the support and a work table carried by the support for movement transversely of the spindle, the combination of transmission and control mechanism for the spindle including a prime mover, a variable speed transmission, a main clutch for coupling the transmission to the prime mover, a speed change mechanism including shiftable members associated with the transmission, electrically operated means for shifting said members, a control switch, individual circuits extending from the switch to the various electrically operated means, a branch transmission continuously driven by the prime mover, a magnetic clutch for coupling the branch transmission to the switch for power positioning thereof, a source of electrical energy, a common supply line for operating said clutch and energizing said shifting means, means for automatically breaking the circuit to the switch upon energization of the magnetic clutch, a control lever for the main clutch, means operated by said lever for interrupting the circuit to the magnetic clutch during actuation of the transmission, detent mechanism for locking said shiftable units during actuation of the transmission, and means operated by said lever upon movement to disengage said main clutch for unlocking said units.

25. In a milling machine having a support, a tool spindle journaled in the support and a work table carried by the support for movement transversely of the spindle, the combination of transmission and control mechanism for the spindle including a prime mover, a variable speed transmission, a main clutch for coupling the transmission to the prime mover, a starting lever for the clutch movable to a first and second position for effecting respectively engagement and disengagement of the clutch, a speed change mechanism associated with the transmission, electrically operated means for shifting the movable members of the transmission, a control drum switch, individual circuits extending from the drum to the various electrically operated means, a branch transmission continuously operated by the prime mover, a magnetic clutch for coupling the branch transmission to the drum, a source of electrical energy, a common supply line therefrom for operating said clutch and said shifting means, dual control switches for selectively connecting the supply line to the clutch or to the shifting means whereby the shiftable members will be stationary during rotation of the drum, and means actuated by the starting lever upon movement to a clutch engaging position for interrupting the circuit to the magnetic clutch and rendering said dual switches ineffective during actuation of the transmission.

26. In a milling machine having a support, a tool spindle movably mounted in the support, and a work table carried by the support for movement transversely of the spindle, the combination of a transmission for effecting one of said movements, said transmission including a plurality of units selectively positionable to yield a plurality of rates, electrical solenoids for shifting said units, a control drum switch, individual control circuits connecting the solenoids to the switch, said drum having individual contact strips for the respective circuits, a pair of electrical supply conduits, a constantly actuated power shaft, a magnetic clutch for coupling the power shaft to the drum for rotation thereby, a first switch for determining energization of said clutch, and a second switch for coupling one of said supply conduits to the drum whereby a prescribed rate may be preselected and subsequently effected at will.

27. In a milling machine having a support, a tool spindle movably mounted in the support, and a work table carried by the support for movement transversely of the spindle, the combination of a transmission for effecting one of said movements, said transmission including a plurality of units selectively positionable to yield a plurality of rates, electrical solenoids for shifting said units, a control drum switch, individual control circuits connecting the solenoids to the switch, said drum having individual contact strips for the respective circuits, a pair of electrical supply conduits, a constantly actuated power shaft, a magnetic clutch for coupling the power shaft to the drum for positioning thereby, a pair of spaced dual control switches for determining energization of said clutch, and a third switch for subsequently coupling one of said supply conduits to the drum switch whereby a prescribed rate may be preselected and subsequently effected at will.

28. In a milling machine having a support, a tool spindle movably mounted in the support and a work table carried by the support for movement transversely of the spindle, the combination with a prime mover, a main clutch and a transmission in the order named for effecting one of said movements, said transmission including a plurality of shiftable units selectively positionable to yield a plurality of rates, of electrical solenoids for shifting said units, a control drum switch, individual control circuits connecting the solenoids to the switch, said drum having individual contact strips for the respective circuits, a pair of electrical supply conduits, a constantly actuated power shaft, a magnetic clutch for coupling the power shaft to the drum for power positioning thereby, a pair of spaced dual control switches for determining energization of said clutch, a third switch for coupling one of said supply conduits to the drum whereby a prescribed rate may be preselected and subsequently effected at will, detent mechanism for maintaining said shiftable units in position during actuation of the transmission, a starting lever for the main clutch and means operable by the starting lever for unlocking said detents during non-actuation of the transmission.

29. A milling machine having a rotatable spindle, a work support movable transversely of the spindle, a variable speed transmission connected to the spindle, a prime mover, a clutch for coupling the prime mover to the transmission, a control lever movable to a first position for engaging said clutch and to a second position for disengaging said clutch, an electrically actuated change speed mechanism associated with the transmission, power actuated means for pre-positioning said mechanism to preselect a desired rate, a switch associated with the control lever for connecting a source of electrical energy with said mechanism to effect subsequently the desired rate, and means operated by the starting lever upon movement to its first position for disconnecting said source of energy from the switch and rendering the same ineffective during the actuation of the transmission.

30. A milling machine having a rotatable spindle and a work support movable transversely of the spindle, means for rotating the spindle including a variable speed transmission, change speed mechanism associated therewith including electrically actuated gear shifting units, a selector for determining the units to be actuated, power actuated means for positioning said selector, a prime mover for the transmission, an electrically actuated clutch for coupling the prime mover to the transmission, a control lever for determining operation of the clutch, said lever having a terminal portion movable relative to the remainder thereof upon application of operating pressure to move the lever to a clutch engaging position, and a control switch adapted to be closed by the relative movement of said terminal portion for connecting a source of electrical energy to said electrically actuated units thereby changing the rate of said transmission.

31. A milling machine having a rotatable spindle and a work support movable transversely of the spindle, means for rotating the spindle including a variable speed transmission, change speed mechanism associated therewith including electrically actuated units, a selector for determining the units to be actuated, power actuated means for positioning said selector, a prime mover for the transmission, an electrically actuated clutch for coupling the prime mover to the transmission, a control lever for determining operation of the clutch, said lever having a terminal portion movable relative to the remainder upon application of operating pressure to move the lever to a clutch engaging position, a control switch adapted to be closed by the relative movement of said terminal portion for connecting a source of electrical energy to said electrically actuated units thereby changing the rate of said transmission, and an additional switch mechanism operated by the control lever upon completion of its starting movement for disconnecting the source of electric energy from said switch rendering the same ineffective although closed during actuation of the transmission.

32. A milling machine having a column, a cutter spindle journaled in the column, a work support carried by the column for movement transversely of the spindle, means for effecting rotation of the spindle including a prime mover, a variable speed transmission, a clutch for coupling the transmission to the prime mover for actuation thereby, a control lever movable to a first position for engaging said clutch and to a second position for disengaging said clutch, a rate change mechanism for the transmission including a plurality of electrically actuated units, a selector for predetermining the units to be actuated and thereby preselecting a rate, a control switch associated with the lever for coupling a source of electrical energy to said units for effecting the preselected rate, a plurality of detent mechanisms associated with the shiftable units, and normally operable to lock the units in their respective positions, electrically actuated means for unlocking said detent mechanism, a control switch operatively connected with the starting lever and effective when the lever is in its second position for energizing said detent unlocking mechanism whereby the units may be shifted when the transmission is stationary, means associated with the switch during movement of the lever from its second position to its first position to energize the main clutch and connect the shifter units to a source of power simultaneously while maintaining the detent mechanism unlocked, and means operable by the lever upon completion of its movement for disconnecting the detent mechanism and the shifting units from a source of power.

33. A machine tool having a support, a tool spindle and a work table carried by the support for relative movement, means to effect said movement including a prime mover, a first transmission for effecting rotation of the tool, an electrically operated clutch for coupling the transmission to the prime mover, a control circuit for the clutch, means to energize said circuit, a power operable rate change mechanism associated with the transmission, a second electrically operated clutch for coupling said mechanism to the prime mover, a control circuit for the second clutch, means coupling said circuit in series with the first control circuit for simultaneous energization therewith, a feed transmission and a rapid traverse transmission for effecting relative movement between the tool spindle and work support, a selector for coupling either transmission to effect said movement at different rates, and means operable by the selector for deenergizing the first named circuits when moved to a position to render the rapid traverse transmission effective.

34. In a milling machine having a tool support and a work support, the combination of means for effecting relative movement of one of said supports including a prime mover, a variable speed transmission, a clutch for coupling the transmission to the prime mover, a starting lever for operating said clutch, a power operable rate change mechanism associated with the transmission including a rate selector, electrically operable means including a control circuit for effecting the rate selected, means associated with the starting lever for energizing said circuit upon movement thereof in a direction to engage said clutch, electrically operable means for locking said rate change mechanism in a given rate position, an additional control circuit therefor, and additional means associated with the starting lever for energizing said last named circuit upon movement of the lever to a clutch engaging position.

LESTER F. NENNINGER.
BERNARD SASSEN.